United States Patent
Zhang et al.

(10) Patent No.: US 12,038,955 B2
(45) Date of Patent: Jul. 16, 2024

(54) METHOD FOR GENERATING QUERY STATEMENT, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Ao Zhang, Beijing (CN); Lijie Wang, Beijing (CN); Xinyan Xiao, Beijing (CN); Tingting Li, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 226 days.

(21) Appl. No.: 17/652,314

(22) Filed: Feb. 24, 2022

(65) Prior Publication Data

US 2022/0179889 A1    Jun. 9, 2022

(30) Foreign Application Priority Data

Jun. 30, 2021   (CN) .......................... 202110733923.8

(51) Int. Cl.
  *G06F 16/00*   (2019.01)
  *G06F 16/33*   (2019.01)
  *G06F 16/332*  (2019.01)

(52) U.S. Cl.
  CPC ...... *G06F 16/3329* (2019.01); *G06F 16/3347* (2019.01)

(58) Field of Classification Search
  CPC .... G06F 16/242; G06F 16/245; G06F 40/205; G06F 40/30

(Continued)

(56) References Cited

U.S. PATENT DOCUMENTS

2016/0092502 A1   3/2016  Krishnamurthy
2018/0329948 A1   11/2018 Nijor et al.
(Continued)

FOREIGN PATENT DOCUMENTS

CN   101788992 A   7/2010
CN   106610999 A   5/2017
(Continued)

OTHER PUBLICATIONS

Office Action for Chinese Application No. 202110733923.8, dated Jun. 5, 2023, 18 pages.

(Continued)

*Primary Examiner* — Monica M Pyo
(74) *Attorney, Agent, or Firm* — Lippes Mathias LLP

(57) ABSTRACT

The disclosure provides a method for generating a query statement. The method includes: determining a first vector representation based on known nodes in a first syntax tree corresponding to a query statement to be generated; determining a target generation strategy corresponding to a target node to be generated based on the first vector representation and a preset copy reference matrix; generating the target node based on the first vector representation or a second vector representation by performing the target generation strategy, in which the second vector representation is a vector representation corresponding to an adjacent query statement prior to the query statement to be generated; and generating the query statement based on the known nodes and a terminator in response to the target node being the terminator.

14 Claims, 7 Drawing Sheets

(58) Field of Classification Search
USPC .......................................................... 707/769
See application file for complete search history.

(56) References Cited

U.S. PATENT DOCUMENTS

2019/0065507 A1* 2/2019 Wang ................... G10L 15/1815
2021/0201174 A1* 7/2021 Huang .................... G06F 40/56

FOREIGN PATENT DOCUMENTS

| CN | 110334179 A | 10/2019 |
| CN | 110609849 A | 12/2019 |
| CN | 111459967 A | 7/2020 |
| CN | 112559552 A | 3/2021 |
| CN | 113032465 A | 6/2021 |

OTHER PUBLICATIONS

Zheng, Zhihe et al.; "Research on the Conversion Method of Structured Query Language to Mapbox Expression"; Geomatics World, vol. 28 No. 3; Mar. 28, 2021; 6 pages; Abstract.
Chen, Siyu et al.; "Improve Neural Machine Translation by Syntax Tree"; Association for Computing Machinery; ISCSIC '18; Sep. 21, 2018; 6 pages.

* cited by examiner

METHOD FOR GENERATING QUERY STATEMENT, ELECTRONIC DEVICE AND STORAGE MEDIUM

CROSS-REFERENCE TO RELATED APPLICATION

This application claims priority to Chinese Patent Application No. 202110733923.8, filed on Jun. 30, 2021, the entire content of which is incorporated herein by reference.

TECHNICAL FIELD

The disclosure relates to the field of computer technologies, in particular to the field of artificial intelligence technologies such as natural language processing and deep learning, and more particular to a method for generating a query statement, an electronic device and a storage medium.

BACKGROUND

With vigorous development of computer technologies, fields such as deep learning, natural language processing and knowledge graph have developed rapidly, and automatic machine question answering (Q&A) has been increasingly applied to real services scenarios, thus it is important to generate a more accurate query statement in the Q&A based on a knowledge base.

SUMMARY

According to a first aspect, the disclosure provides a method for generating a query statement. The method includes: determining a first vector representation based on known nodes in a first syntax tree corresponding to a query statement to be generated; determining a target generation strategy corresponding to a target node to be generated based on the first vector representation and a preset copy reference matrix; generating the target node based on the first vector representation or a second vector representation by performing the target generation strategy, in which the second vector representation is a vector representation corresponding to an adjacent query statement prior to the query statement to be generated; and generating the query statement based on the known nodes and a terminator in response to the target node being the terminator.

According to a second aspect, the disclosure provides an electronic device. The electronic device includes: at least one processor and a memory communicatively connected to the at least one processor. The memory stores instructions executable by the at least one processor, and when the instructions are executed by the at least one processor, the at least one processor is caused to execute the method for generating the query statement according to the first aspect.

According to a third aspect, the disclosure provides a non-transitory computer-readable storage medium storing computer instructions. The computer instructions are configured to cause the computer to execute the method for generating the query statement according to the first aspect.

It should be understood that the content described in this section is not intended to identify the key or important features of embodiments of the disclosure, nor is it intended to limit the scope of the disclosure. Additional features of the disclosure will be easily understood through the following description.

BRIEF DESCRIPTION OF THE DRAWINGS

The drawings are used to better understand the solution and do not constitute a limitation of the disclosure, in which.

DETAILED DESCRIPTION

The exemplary embodiments of the disclosure are described below in combination with the accompanying drawings, which include various details of the embodiments of the disclosure to aid in understanding, and should be considered merely exemplary. Therefore, those skilled in the art should know that various changes and modifications can be made to the embodiments described herein without departing from the scope and spirit of the disclosure. For the sake of clarity and brevity, descriptions of well-known features and structures have been omitted from the following description.

Artificial Intelligence (AI) is a discipline that studies and allows computers to simulate certain thinking processes and intelligent behaviors (such as learning, reasoning, thinking and planning) of human, which has both hardware-level technologies and software-level technologies. AI hardware technology generally includes technologies such as sensors, dedicated AI chips, cloud computing, distributed storage, and big data processing. AI software technology generally includes computer vision technology, speech recognition technology, natural language processing technology, machine learning, deep learning, big data processing technology, knowledge map technology and other aspects.

Natural language processing uses computers to process, understand and apply human languages (such as Chinese and English), which is an inter-discipline of computer science and linguistics, also known as computational linguistics. Natural language is the fundamental sign that distinguishes humans from other animals. There is no way to talk about human thinking without using language, so natural language processing embodies the highest task and state of AI, that is, only when the computer has the ability to process natural language, the machine can be regarded as intelligent.

Deep learning refers to a multi-layer artificial neural network and the training method. A layer of neural network will take a large number of matrix numbers as input, and take weights through a nonlinear activation method, to generate another data set as output. Through the appropriate number of matrices, multiple layers of organization are linked together, to generate a neural network "brain" for precise and complex processing, like people recognizing labeled objects in an image.

A method for generating a query statement, an apparatus for generating a query statement, an electronic device and a storage medium of embodiments of the disclosure are described below with reference to the accompanying drawings.

The method for generating the query statement of embodiments of the disclosure is executed by the apparatus for generating the query statement of embodiments of the disclosure, and the apparatus can be configured in an electronic device.

For the convenience of description, the apparatus for generating the query statement of the disclosure is referred to as "input device" for short.

Figure 1:
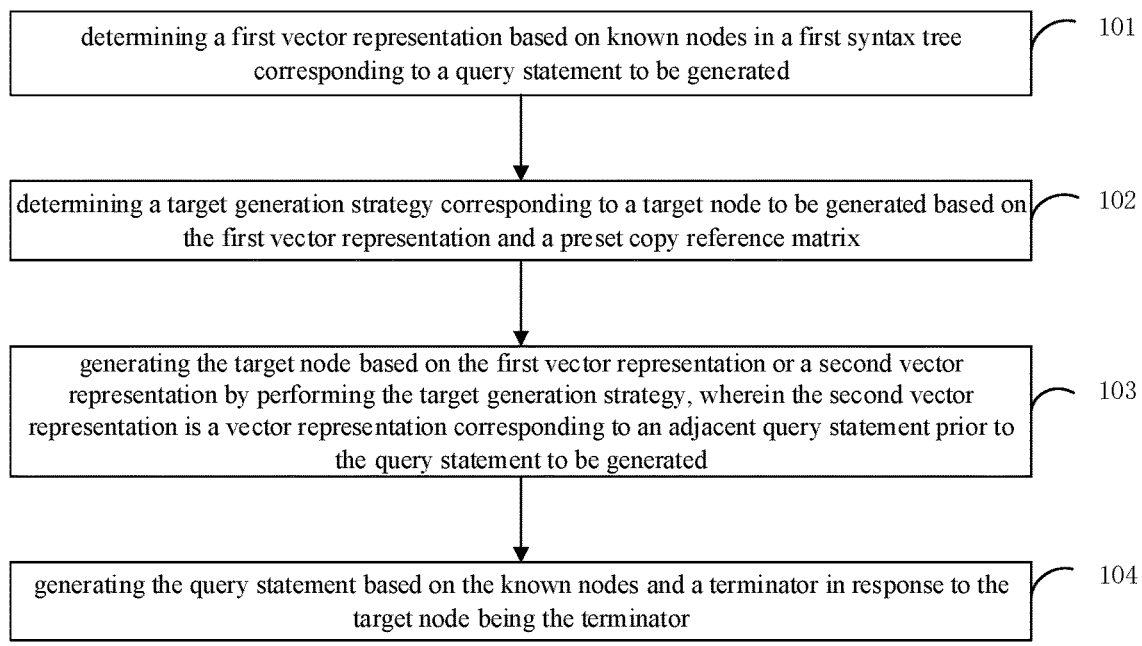
FIG. 1 is a flowchart of a method for generating a query statement according to some embodiments of the disclosure.

FIG. 1 is a flowchart of a method for generating a query statement according to some embodiments of the disclosure.

As shown in FIG. 1, the method includes the following.

In 101, a first vector representation is determined based on known nodes in a first syntax tree corresponding to a query statement to be generated.

It can be understood that a syntax tree can be a graphical representation of a structure of a sentence and represents a deduction result of the sentence, which is conducive to understanding gradations of a grammatical structure of the sentence, that is, the syntax tree can be formed by performing deduction based on a certain rule. Therefore, the first syntax tree in the disclosure may be correspondingly formed in the process of determining the query statement to be generated and may represent the deduction result of the query statement.

In addition, the first vector representation may be in the form of a matrix or may also be in the form of a vector, which is not limited in the disclosure.

There may be multiple ways of determining the first vector representation.

For example, a vector corresponding to each known node in the first syntax tree may be spliced to obtain the first vector representation. Alternatively, a vector corresponding to each known node in the first syntax tree can also be merged based on relationships of the known nodes and the obtained result is the first vector representation, which is not limited in the disclosure.

In 102, a target generation strategy corresponding to a target node to be generated is determined based on the first vector representation and a preset copy reference matrix.

The target generation strategy is used to indicate a specific generation method of the target node, for example, execution of a copy action and copy content or non-execution of a copy action, which is not limited in the disclosure.

In addition, there may be many ways of determining the target generation strategy corresponding to the target node to be generated.

For example, the first vector representation can be multiplied with the preset copy reference matrix, and then the target generation strategy corresponding to the target node to be generated is determined based on a product result.

For example, a threshold can be set in advance. If a product of the preset copy reference matrix and the first vector representation is greater than the threshold, the copy action is executed; and if the product is less than the threshold, the copy action is not executed.

Or, if a product of the preset copy reference matrix and the first vector representation is vector (1, 1, 1), the copy action is executed, and copy content is grammar in the previously generated syntax tree. If the product is other vector, no copy action is executed or the copy action is not executed.

It should be noted that the foregoing example is only an example, and may not be used as a limitation on the method of determining the target generation strategy corresponding to the target node to be generated in embodiments of the disclosure.

In 103, the target node is generated based on the first vector representation or a second vector representation by performing the target generation strategy, in which the second vector representation is a vector representation corresponding to an adjacent query statement prior to the query statement to be generated.

For example, the target generation strategy is that the copy action is not executed. Then, a vector corresponding to the target node is generated directly based on the first vector representation, that is, the target node is generated.

Or, if the target generation strategy is that the copy action is executed and the copy content is a node in the syntax tree corresponding to the adjacent query statement prior to the query statement to be generated, the target node is generated based on the second vector representation corresponding to the adjacent query statement prior to the query statement.

Therefore, when generating the target node, the content of each known node in the query statement to be generated and the adjacent query statement prior to the query statement is fully considered, that is, the context semantic information is fully considered, thereby improving the accuracy and reliability of generating the target node and providing a guarantee for subsequent processing.

It should be noted that the foregoing example is only an example, and may not be used as a limitation on the manner of generating the target node in embodiments of the disclosure.

In 104, the query statement is generated based on the known nodes and a terminator in response to the target node being the terminator.

The terminator can represent the end of the query statement, that is, the syntax tree corresponding to the query statement has been generated when this node is reached.

In embodiments of the disclosure, the first vector representation may be determined based on each known node in the first syntax tree corresponding to the query statement to be generated. The target generation strategy corresponding to the target node to be generated is determined based on the first vector representation and the preset copy reference matrix. The target node is generated based on the first vector representation or the second vector representation by performing the target generation strategy. The query statement is generated based on the known nodes and the terminator in response to the target node being the terminator. Therefore, in the process of generating the query statement, the context semantic information is fully considered, thereby improving the accuracy and reliability of the query statement.

In the above embodiments, the target generation strategy can be determined based on the first vector representation determined by each known node in the first syntax tree and the preset copy reference matrix, and the target node is generated by executing the target generation strategy. The query statement is generated based on the known nodes and the terminator in response to the target node being the terminator. In the actual implementation process, if the target node is not the terminator, the first vector representation can be updated based on the target node and each known node, and then continue to generate a new target node. The above process is described below with reference to FIG. 2A.

Figure 2A:
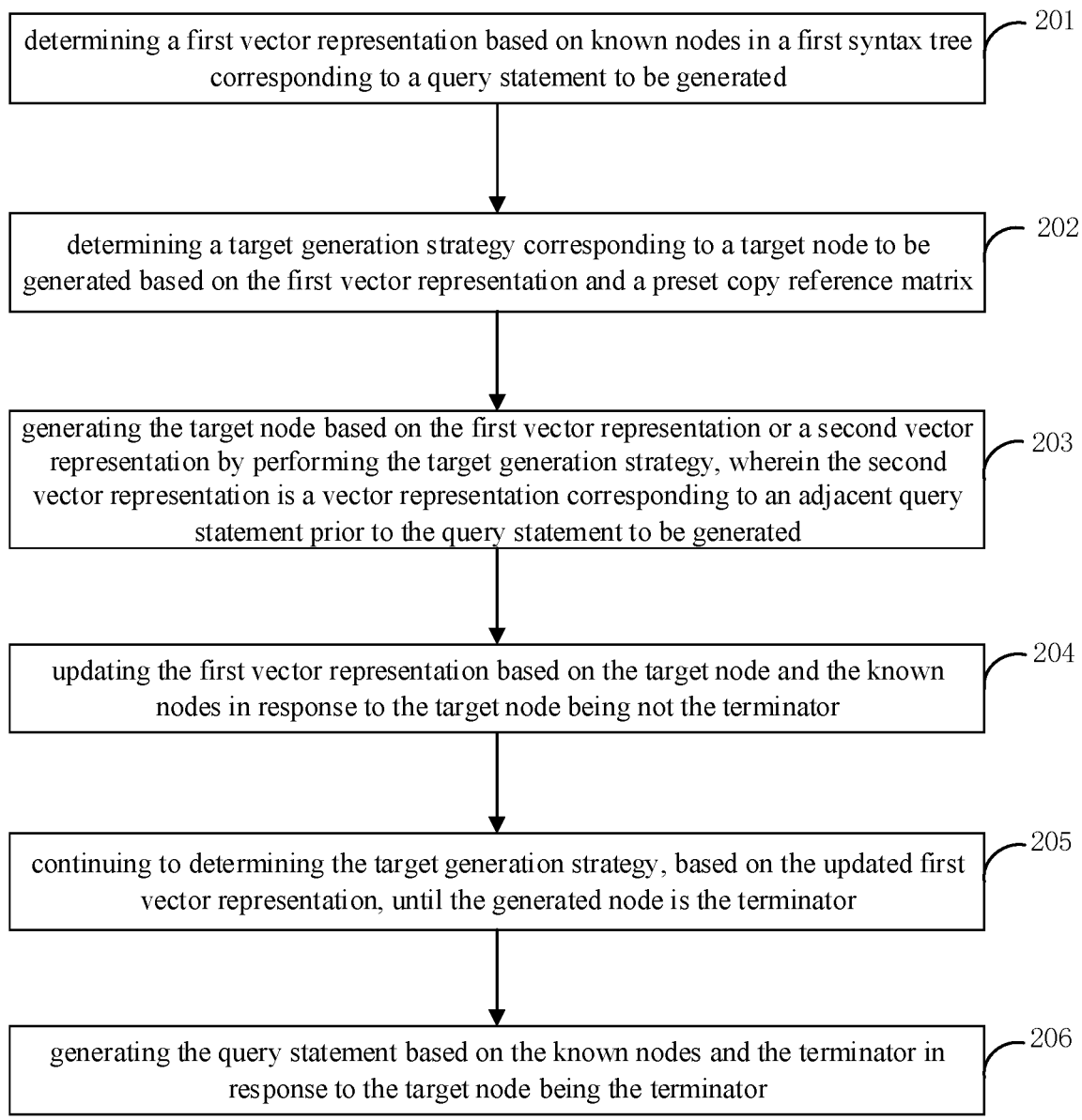
FIG. 2A is a flowchart of a method for generating a query statement according to some embodiments of the disclosure.

FIG. 2A is a flowchart of a method for generating a query statement according to some embodiments of the disclosure.

As shown in FIG. 2A, the method may include the following.

In 201, a first vector representation is determined based on known nodes in a first syntax tree corresponding to a query statement to be generated.

There may be many ways to determine the root node in the first syntax tree corresponding to the query statement to be generated.

For example, keywords in a question sentence can be encoded to generate a corresponding vector, that is, to generate the root node.

Alternatively, it is also possible to determine the root node based on the encoding result of the question sentence and the knowledge base to be queried, which is not limited in the disclosure.

It can be understood that the question sentence may be in a text form or may also be in a voice form which is transformed into a text form after processing, which is not limited in the disclosure.

Optionally, the question sentence can be encoded first to determine a third vector representation corresponding to the question sentence, and then a reference vector representation is determined based on the third vector representation, the second vector representation and the knowledge base to be queried. Based on the reference vector representation and the preset copy reference matrix, the target generation strategy corresponding to the root node in the first syntax tree is determined, and then the target generation strategy is executed to generate the root node based on the reference vector representation or the second vector representation.

There are many ways to encode the question sentence.

For example, the question sentence can be taken as a text sequence, and then a bidirectional long short-term memory (LSTM) can be used as an encoder for encoding; or, recurrent neural network (RNN) or a multi-layer LSTM are used for encoding. The encoding result is the third vector representation corresponding to the question sentence, which is not limited in the disclosure.

In addition, the knowledge base to be queried may have various forms, such as a knowledge graph, a relational database and an electronic form, which is not limited in the disclosure.

In addition, there may be multiple ways of determining the reference vector representation.

For example, the vectors such as the third vector representation, the second vector representation and the knowledge base to be queried may be weighted and merged based on the weight of the third vector representation, the weight of the second vector representation and the weight of the knowledge base to be queried, and the result is the reference vector representation.

Alternatively, the third vector representation, the second vector representation and the vector representation corresponding to the knowledge base to be queried are spliced to obtain the reference vector representation, which is not limited in the disclosure.

In addition, there may be multiple situations of generating the root node by performing the target generation strategy.

For example, if the target generation strategy is that the copy action is not executed, the root node is generated directly based on the reference vector representation. For example, the reference vector representation is determined as the root node.

Alternatively, if the target generation strategy is that the copy action is executed and the copy content is a node in the syntax tree corresponding to the adjacent query statement prior to the query statement, the root node is generated based on the second vector representation corresponding to the adjacent query statement prior to the query statement.

It should be noted that the foregoing example is only an example, and may not be used as a limitation on the way of generating the root node in embodiments of the disclosure.

It can be understood that each node in the first syntax tree can be determined based on the above way of determining the root node, and then the first vector representation is determined, in which this process will not be repeated herein.

In 202, a target generation strategy corresponding to a target node to be generated is determined based on the first vector representation and a preset copy reference matrix.

In 203, the target node is generated based on the first vector representation or a second vector representation by performing the target generation strategy, in which the second vector representation is a vector representation corresponding to an adjacent query statement prior to the query statement to be generated.

In 204, the first vector representation is updated based on the target node and the known nodes in response to the target node being not a terminator.

If the target node being not the terminator, it indicates that the syntax tree corresponding to the query statement can be continued to be generated when the node is reached.

In addition, there may be multiple ways to update the first vector representation.

For example, the first vector representation can be updated based on relationships among the target node and the known nodes. Alternatively, the target node and the known nodes can also be spliced to update the first vector representation, which is not limited in the disclosure.

In embodiments of the disclosure, the target node can be generated based on the first vector representation or the second vector representation, so that the generated target node fully considers the context semantic information, thereby improving the accuracy and reliability of the target node. Afterwards, when the target node is not the terminator, the first vector representation is updated based on the target node and each known node. Therefore, the updated first vector representation can be made more accurate and reliable, which provides a guarantee for the reliability and accuracy of subsequent processing.

In 205, determining the target generation strategy is continued, based on the updated first vector representation, until the generated node is the terminator.

It is understandable that the updated first vector representation fully takes into account the context semantic information. Therefore, based on the updated first vector representation, the generated target node is also more accurate and reliable.

In embodiments of the disclosure, when the target node is not the terminator, the process of updating the first vector representation and generating the target node based on the updated first vector representation can be repeated, so that the update of the first vector representation and the generation of the target node fully consider the complete semantics, thereby improving accuracy and reliability.

In 206, the query statement is generated based on the known nodes and the terminator in response to the target node being the terminator.

For example, the generated query statement is: SELECT model FROM car table WHERE energy type="fuel" AND sales> (SELECT AVG (sales) FROM car table), the corresponding syntax tree can be shown in FIG. 2B.

Figure 2B:
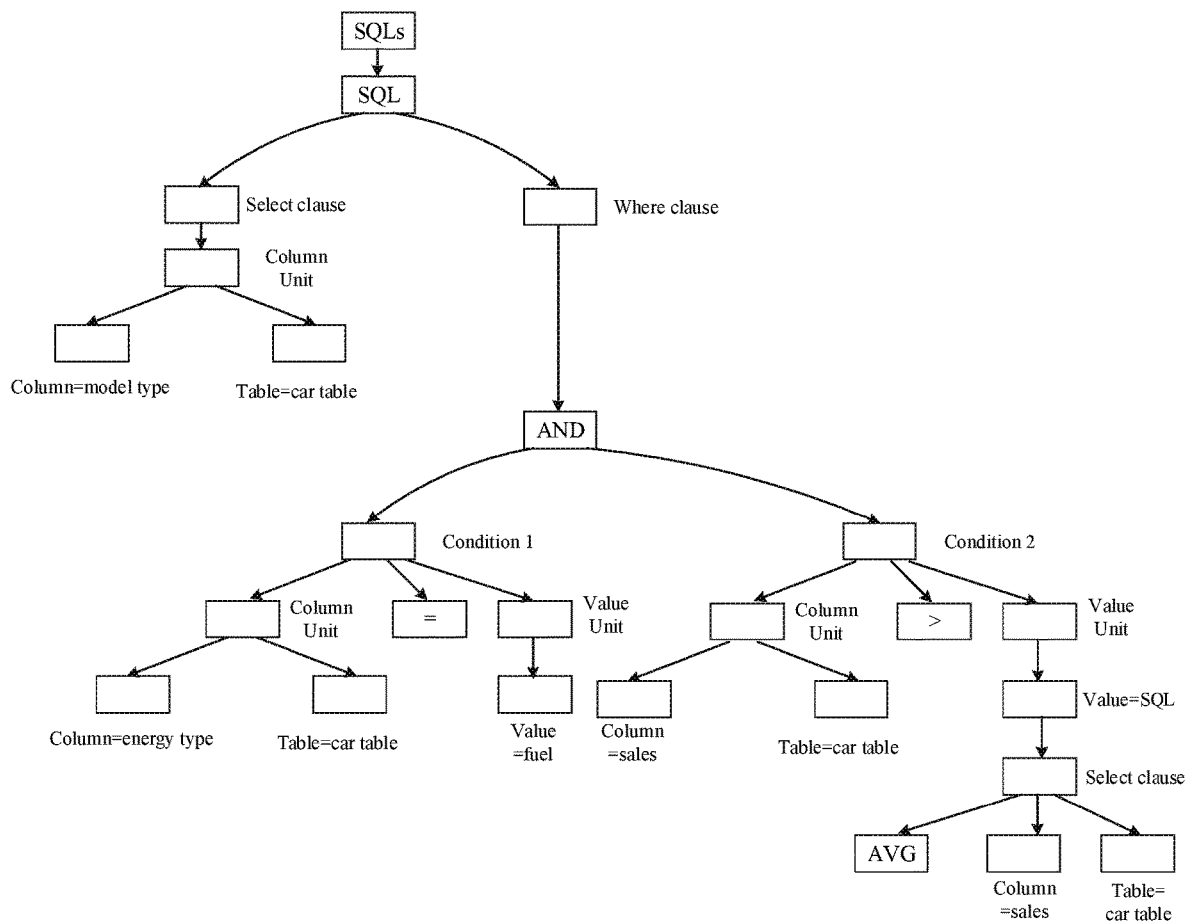
FIG. 2B is a schematic diagram of a syntax tree according to some embodiments of the disclosure.

It can be understood that in the process of executing the syntax tree as shown in FIG. 2B, the depth-first traversal of the syntax tree is performed, and there are certain syntax restrictions at each time stamp t, thereby ensuring the correctness of the syntax.

Figure 2C:
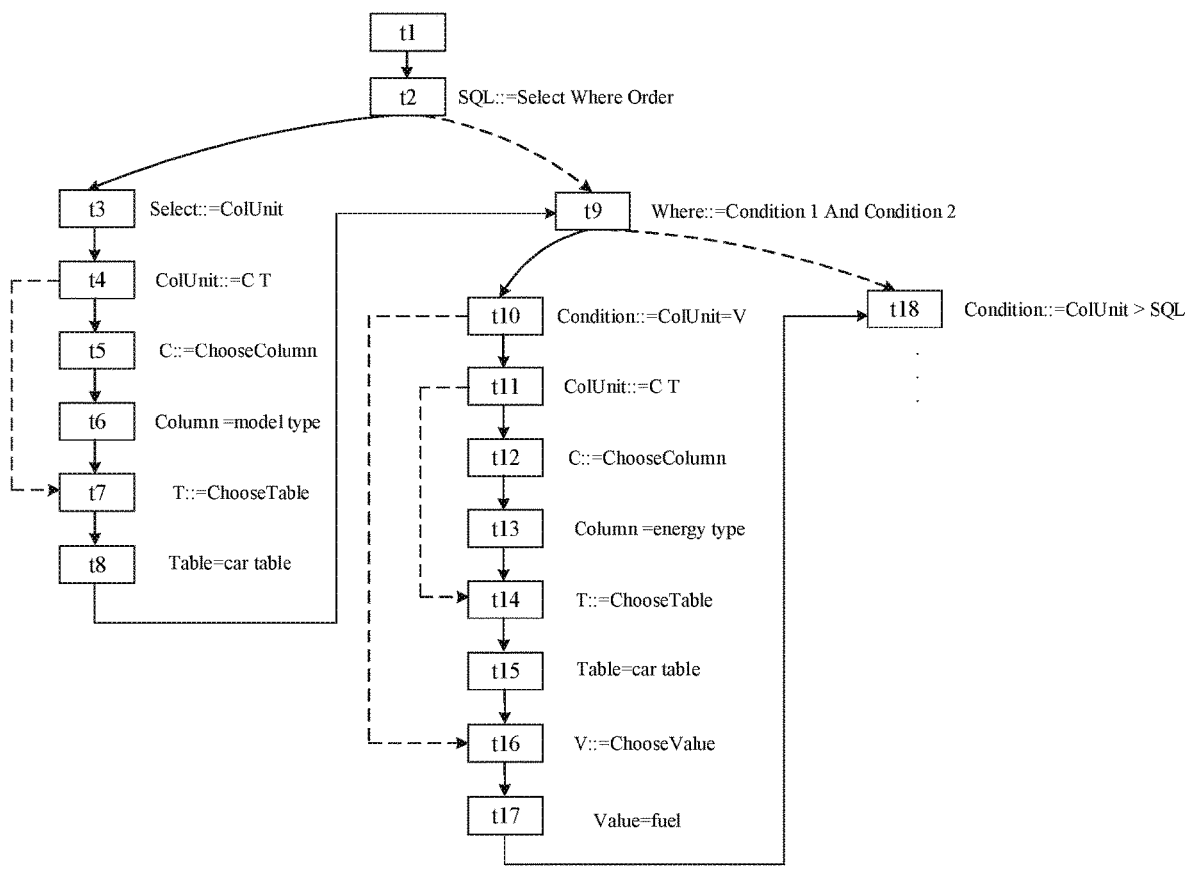
FIG. 2C is a schematic diagram of an execution process of a syntax tree according to some embodiments of the disclosure.

In addition, a schematic diagram of the execution process of the syntax tree shown in FIG. 2B may be shown in FIG. 2C. In this case, the nodes shown in FIG. 2C are in correspondence with the nodes in the syntax tree shown in FIG. 2B, the solid arrows indicate the execution process, and the dashed arrows indicate the parent-child relationship between part of the nodes.

In embodiments of the disclosure, the first vector representation may be determined based on each known node in the first syntax tree corresponding to the query statement to be generated. The target generation strategy corresponding to the target node to be generated is determined based on the first vector representation and the preset copy reference matrix. The target node is generated based on the first vector representation or the second vector representation by performing the target generation strategy. The first vector representation is updated based on the target node and the known nodes in response to the target node being not the terminator. The determining the target generation strategy is repeated until the generated node is the terminator. Afterwards, the query statement is generated based on the known nodes and the terminator in response to the target node being the terminator. Thus, by updating the first vector representation several times and then generating the target node based on the updated first vector representation to generate the query statement, the generated query statement can be made to fully incorporate the complete semantics of the context, thus improving the accuracy and reliability of the generated query statement.

In the above embodiments, in the case where the target node is not the terminator, the first vector representation is updated based on the target node and each known node, generating of new target node can be continued, to generate the query statement. In the actual implementation, the base vector representation corresponding to each node in the second syntax tree can also be updated, to obtain the second vector representation corresponding to the adjacent query statement prior to the query statement. The above process is explained in detail in combination with FIG. 3 below.

Figure 3:
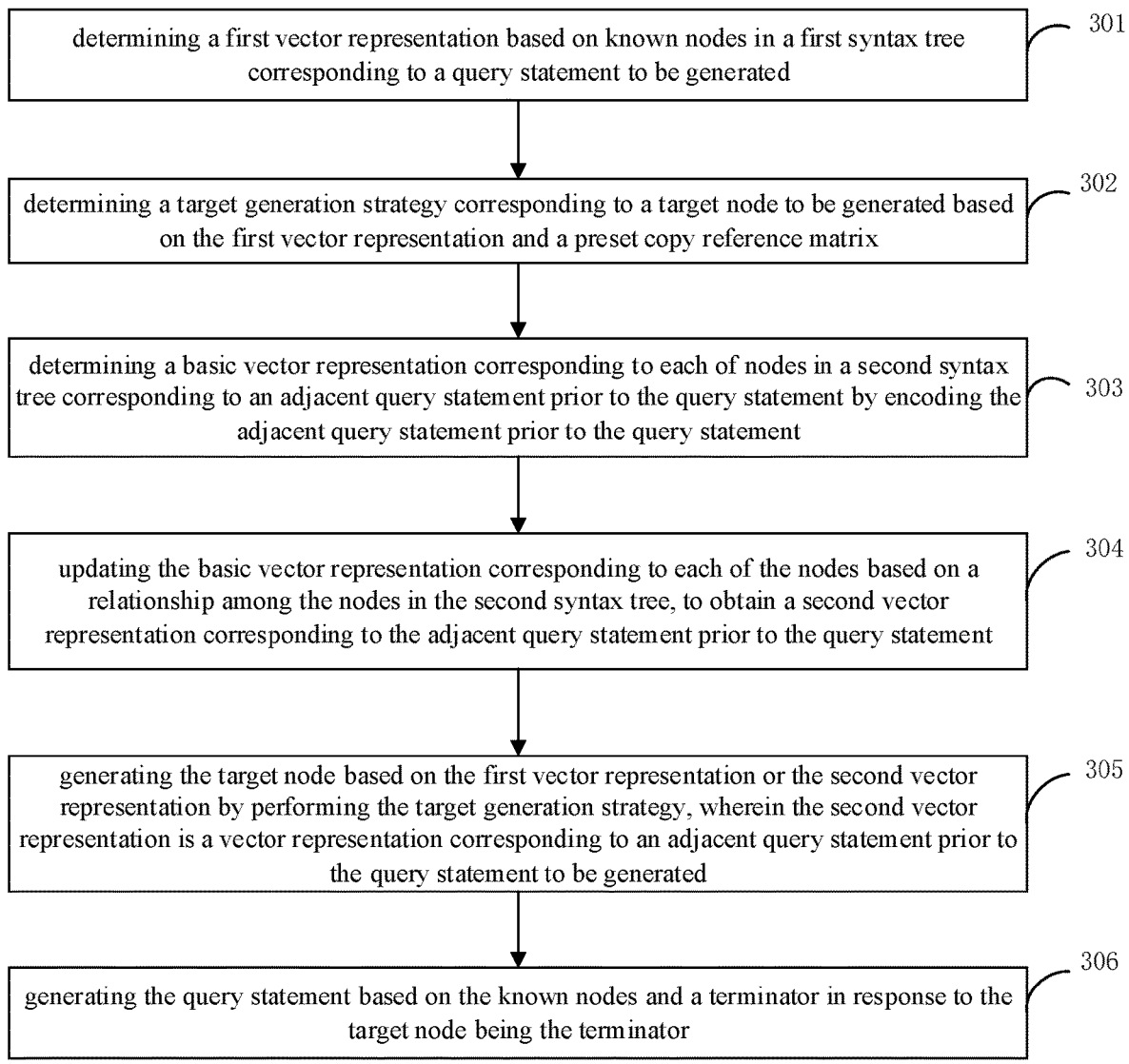
FIG. 3 is a flowchart of a method for generating a query statement according to some embodiments of the disclosure.

FIG. 3 is a flowchart of a method for generating a query statement according to some embodiments of the disclosure. As shown in FIG. 3, the method may include the following.

In 301, a first vector representation is determined based on known nodes in a first syntax tree corresponding to a query statement to be generated.

In 302, a target generation strategy corresponding to a target node to be generated is determined based on the first vector representation and a preset copy reference matrix.

In 303, a basic vector representation corresponding to each of nodes in a second syntax tree corresponding to an adjacent query statement prior to the query statement is determined by encoding the adjacent query statement prior to the query statement.

The query statement can be in various formats, for example, in structured query language (SQL), which is not limited in the disclosure.

There are various ways to encode the adjacent query statement prior to the query statement.

For example, the adjacent query statement prior to the query statement can be encoded as a text sequence, and then a bidirectional LSTM (BiLSTM) can be used as an encoder for encoding.

Alternatively, an RNN or a multi-layer LSTM can be used to encode the query statement. The coding result is the basic vector representation corresponding to each of nodes in the second syntax tree, which is not limited in the disclosure.

Alternatively, the adjacent query statement prior to the query statement can be encoded using equation (1) as described below.

$$Enc_{base} = \text{BiLSTM}(\text{SQL Tokens}) \tag{1}$$

$Enc_{base}$ is the basic vector representation corresponding to each of nodes in the second syntax tree corresponding to the adjacent query statement prior to the query statement, BiLSTM is the bidirectional LSTM, SQL is the format of the adjacent query statement prior to the query statement, and Tokens is each vector in the adjacent query statement prior to the query statement.

It should be noted that the above example is only an illustration and may not be used as a limitation of the way to encode the adjacent query statement prior to the query statement in embodiments of the disclosure.

In 304, the basic vector representation corresponding to each of the nodes is updated based on a relationship among the nodes in the second syntax tree, to obtain the second vector representation corresponding to the adjacent query statement prior to the query statement.

There may be various relationship among the nodes in the second syntax tree, for example, juxtaposition and inclusion, which is not limited in the disclosure.

In addition, after the basic vector representation corresponding to each of the nodes is updated, the nodes may be spliced in a sequential order, to obtain the second vector representation corresponding to the adjacent query statement prior to the query statement. Alternatively, after the basic vector representation corresponding to each of the nodes is updated, the updated vector representation corresponding to each node may be merged based on the relationship among subtrees in the second syntax tree, to determine the second vector representation corresponding to the adjacent query statement prior to the query statement, which is not limited in the disclosure.

In addition, there are various ways to update the basic vector representation corresponding to each of the nodes, for example, the second syntax tree can be updated based on the weight factor and the basic vector representation corresponding to each of the nodes in the second syntax tree or an attention model generated by training can be adopted, which is not limited in the disclosure.

Optionally, the basic vector representation of each node can be updated based on the weight factor corresponding to each node in the second syntax tree using the basic vector representation of the child nodes associated with each node, to obtain the updated vector representation of each node. Afterwards, the second vector representation corresponding to the adjacent query statement prior to the query statement can be determined based on the updated vector representation of each node.

The weight factor corresponding to each node can be set by the user as needed or can also be obtained by training, which is not limited in the disclosure.

For example, the node B in the second syntax tree corresponds to a weight factor of 0.5, and its corresponding basis vector is (0 0 1), and the child nodes associated with the node B are B1 and B2, whose corresponding basic vectors are (0 1 0) and (1 0 0), respectively. The basic vectors corresponding to B1 and B2 are summed to obtain the vector (1 1 0), whose corresponding weight factor is 0.5, and then weight fusion is performed on the vectors, to obtain 0.5*(0 0 0 1)+0.5(1 1 0), which is the updated vector representation of node B.

Alternatively, the basic vector for each node can be updated using equation (2) as described below.

$$Enc_{update} = \alpha * Enc_{base}^{current} + (1-\alpha) * \sum_{i \in Children} Enc_{base}^{i} \quad (2)$$

$Enc_{update}$ is the updated vector representation corresponding to each node, a is the weight factor corresponding to each node, $Enc_{base}^{current}$ is the basic vector representation corresponding to each node, $(1-\alpha)$ is the weight factor of the child nodes associated with each node, $Enc_{base}^{i}$ is the basic vector representation of the child nodes associated with each node, where i is the child node associated with the node.

It is to be noted that the above examples are only illustrative and are not to be taken as a limitation of each node, the corresponding weight factors, and the manner of updating the vector representation of the nodes in embodiments of the disclosure.

It is understood that each node in the second syntax tree can be updated in turn based on the above way of updating the vector representation of node B, and thus the updated vector representation of each node can be obtained, and the process is not repeated herein. Afterwards, the updated vector representation of each node can be spliced as the second vector representation corresponding to the adjacent query statement prior to the query statement; or, the updated vector representation of each node can be merged based on the relationship among the nodes in the second syntax tree, and the result is the second vector representation corresponding to the adjacent query statement prior to the query statement, which is not limited in the disclosure.

In embodiments of the disclosure, the basic vector corresponding to each node in the second syntax tree is updated with full consideration of the corresponding weights of the nodes in the second syntax tree, thereby improving the accuracy and reliability of the determined second vector representation.

Optionally, the updated vector representation of each node can also be obtained using a first attention model generated by training.

In detail, one or more child nodes corresponding to each node is determined based on the relationship among the nodes in the second syntax tree. The basic vector of each node and the basic vectors corresponding to the one or more child nodes are input into the first attention model generated by training, to obtain the updated vector representation of each node. The second vector representation corresponding to the adjacent query statement prior to the query statement is determined based on the updated vector representation of each node.

The first attention model may be an attention model that has been generated in advance by training, the basic vector of each node in the second syntax tree and the basic vectors corresponding to the one or more child nodes are processed by the first attention model, and the updated vector representation of each node can be output.

It can be appreciated that the first attention model in the disclosure encodes each input vector into a vector sequence. In the process of decoding, a subset of the vector sequences can be selectively chosen for further processing, so that each output can be generated in such a way that the information carried by the input sequences is fully utilized. Therefore, the updated vector representation of each node fully combines the basic vector of each node and the base vectors of the one or more child nodes, that is, the contextual semantic information is fully considered, so that the updated vector representation of each node is more reliable and accurate, and the accuracy and reliability of the second vector representation can be improved.

In addition, when training the first attention model, the first input vector is the node to be updated and is set in advance. Alternatively, the last input vector is the node to be updated. Alternatively, it is also possible to set the input order as needed, which is not limited in the disclosure.

For example, based on the relationship among the nodes in the second syntax tree, it is determined that the corresponding child nodes of node B are B1, B2, and the first input vector is the node to be updated by the first attention model. Thereby, the basic vector nodes of node B, child nodes B1, and B2 can be input to the first attention model in order, and the updated vector representation of node B can be output after processing.

Alternatively, the basic vector of each node can be updated using equation (3) as described below.

$$Enc_{update} = ReLU(Linear(Concat(Enc_{base}^{current}, Attention(Enc_{base}^{current}, Enc_{base}^{Children})))) \quad (3)$$

$Enc_{update}$ is the updated vector representation of each node, ReLU is an activation function, Linear is a linear mapping function, Concat is a vector splicing operator, $Enc_{base}^{current}$ is the basic vector representation of each node, Attention is an operator that calculates attention, and $Enc_{base}^{Children}$ is the basic vector representation of the child node of each node.

It is to be noted that the above examples are only illustrative and are not to be taken as limiting the method of determining the updated vector representation of each node using the first attention model in embodiments of the disclosure.

It is understood that each node in the second syntax tree can be updated in turn based on the above way of updating the vector representation of node B, and thus the updated vector representation of each node can be obtained, and the process is not repeated herein. Afterwards, the updated vector representation of each node can be spliced as the second vector representation corresponding to the adjacent query statement prior to the query statement; or, the updated vector representation of each node can be merged based on the relationship among the nodes in the second syntax tree, and the result is the second vector representation corresponding to the adjacent query statement prior to the query statement, which is not limited in the disclosure.

In embodiments of the disclosure, the basic vector corresponding to each node in the second syntax tree is updated with full consideration of the relationship between each node and the child node in the second syntax tree, so that, by processing using the first attention model, the second vector representation also incorporates the relationships among the nodes in the second syntax tree, thereby improving the accuracy and reliability of the second vector representation.

Optionally, a second attention model may also be used to obtain the updated vector representation of each node.

In detail, the one or more child nodes corresponding to each node can be determined based on the relationship among the nodes in the second syntax tree. The third vector representation corresponding to the existing question sentence can be obtained, after which the third vector representation, the basic vector of each node and the basic vector of the corresponding child node can be input into the second attention model generated by training, to obtain the updated vector representation of each node. The second vector representation corresponding to the adjacent query statement prior to the query statement is determined based on the updated vector representation of each node.

The second attention model may be an attention model that has been generated in advance of training, the third vector representation, the basic vector of each node and the basic vectors of the corresponding child nodes are input into the second attention model. After the processing of the second attention model, the updated vector representation of each node can be output.

It can be appreciated that the second attention model in the disclosure can encode each input vector into a vector sequence, after which a subset of the vector sequences can be selectively chosen for further processing at each action in the process of decoding, so that the information carried by the input sequences can be fully utilized in producing each output. Therefore, the updated vector representation of each node fully combines the content of the question sentence and the basic vectors of each node and corresponding sub-nodes, i.e., the contextual semantic information is fully considered, so that the updated vector representation of each node is more reliable and accurate, and thus the accuracy and reliability of the second vector representation can be improved.

In addition, when training the second attention model, it can be set in advance that the first input vector is the node to be updated; or, it can also be set that the last input vector is the node to be updated; or, the input order is set as needed, which is not limited in the disclosure.

For example, based on the relationship among the nodes in the second syntax tree, it is determined that the corresponding child nodes of node B are B1, B2, and the first input vector is the node to be updated by using the second attention model. Thereby, the basic vector nodes of node B, child nodes B1 and B2 and the third vector representation can be input into the first attention model in order, and the updated vector representation of node B can be output after processing.

Alternatively, the basic vector for each node can be updated using equation (4) as described below.

$$Enc_{update} = \text{ReLU}(\text{Linear}(\text{Concat}(Enc_{base}^{current}, \text{Attention}(Enc_{question}, Enc_{base}^{Children})))) \quad (4)$$

$Enc_{update}$, is the updated vector representation of each node, ReLU is an activation function, Linear is a linear mapping function, Concat is a vector splicing operator, $Enc_{base}^{current}$ is the basic vector representation of each node, Attention is an operator that computes attention, $Enc_{question}$ is the third vector representation, and $Enc_{base}^{Children}$ is the basic vector representation of the corresponding child node of each node.

It is to be noted that the above examples are only illustrative and are not to be taken as limiting the method of determining, for example, the updated vector representation of each node using the second attention model in embodiments of the disclosure.

It is understood that each node in the second syntax tree can be updated in turn based on the above way of updating the vector representation of node B, and thus the updated vector representation of each node can be obtained, and the process is not repeated herein. Afterwards, the updated vector representation of each node can be spliced as the second vector representation corresponding to the adjacent query statement prior to the query statement; or, the updated vector representation of each node can be merged based on the relationship among the nodes in the second syntax tree, and the result is the second vector representation corresponding to the adjacent query statement prior to the query statement, which is not limited in the disclosure.

In embodiments of the disclosure, the basic vector corresponding to each node in the second syntax tree is updated with full consideration of the relationship among the nodes in the second syntax tree and the existing question sentence. The second vector representation obtained by processing using the second attention model also incorporates the relationship among the nodes in the second syntax tree and the existing question sentence, i.e., with full consideration of context semantic information, thus improving the accuracy and reliability of the determined second vector representation.

It is to be noted that in the disclosure, 301 and 302 may be performed before 303 and 304, or 303 and 304 may be performed before 301 and 302, or 301 and 302 may also be performed in parallel with 303 and 304, which is not limited in the disclosure.

In 305, the target node is generated based on the first vector representation or a second vector representation by performing the target generation strategy, in which the second vector representation is a vector representation corresponding to an adjacent query statement prior to the query statement to be generated.

In 306, the query statement is generated based on the known nodes and a terminator in response to the target node being the terminator.

In embodiments of the disclosure, the first vector representation may be determined based on each known node in the first syntax tree corresponding to the query statement to be generated. The target generation strategy corresponding to the target node to be generated is determined based on the first vector representation and the preset copy reference matrix. The basic vector representation corresponding to each of nodes in the second syntax tree corresponding to the adjacent query statement prior to the query statement is determined by encoding the adjacent query statement prior to the query statement. The basic vector representation corresponding to each of the nodes is updated based on the relationship among the nodes in the second syntax tree, to obtain the second vector representation corresponding to the adjacent query statement prior to the query statement. The target node is generated based on the first vector representation or the second vector representation by performing the target generation strategy. The query statement is generated based on the known nodes and the terminator in response to the target node being the terminator. Thus, by updating the basic vector representation corresponding to each node in the second syntax tree to obtain the second vector representation corresponding to the adjacent query statement prior to the query statement, the target node is generated based on the second vector representation, to generate the query statement. The generated query statement can be fully integrated with the complete semantics of the context, thus improving the accuracy and reliability of the generated query statement.

In the above embodiments, by updating the basic vector representation corresponding to each node in the second syntax tree, to obtain the second vector representation corresponding to the adjacent query statement prior to the query statement. The accuracy and reliability of the generated query statement are improved by generating the target node based on the second vector representation, to generate the query statement. In a possible implementation, the target node may also be a non-leaf node, and the target generation strategy may also include a first operator for indicating whether to perform a copy action when generating the target node and a second operator for indicating whether to perform a grammar copy action. The above process is further described below in combination with FIG. 4.

Figure 4:
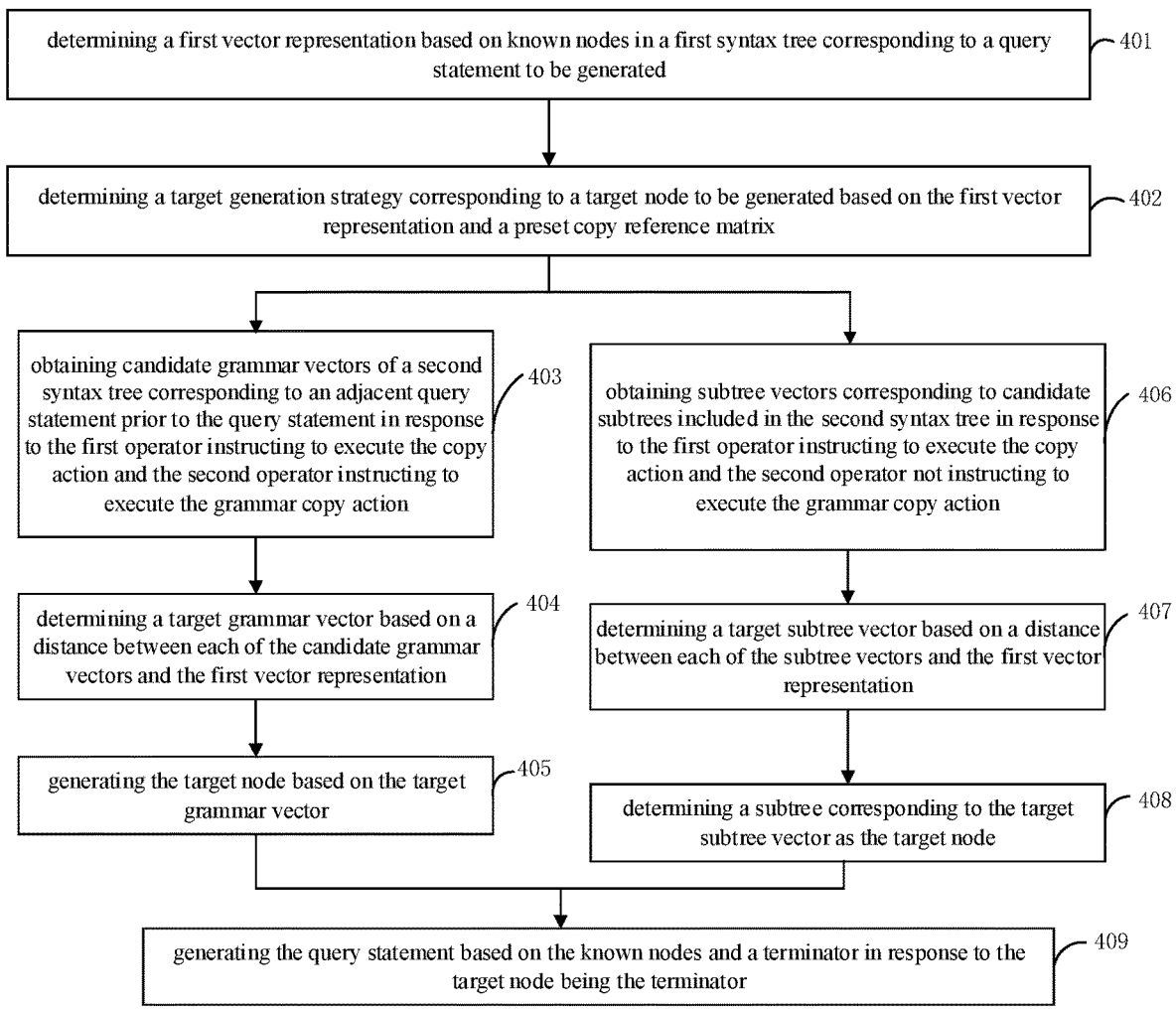
FIG. 4 is a flowchart of a method for generating a query statement according to some embodiments of the disclosure.

FIG. 4 is a flowchart of a method for generating a query statement according to some embodiments of the disclosure. As shown in FIG. 4, the method may include the following.

In 401, a first vector representation is determined based on known nodes in a first syntax tree corresponding to a query statement to be generated.

In 402, a target generation strategy corresponding to a target node to be generated is determined based on the first vector representation and a preset copy reference matrix.

For example, based on the first vector representation and the preset copy reference matrix, the target generation strategy corresponding to the target node to be generated may be determined, which may include a first operator for indicating whether to perform a copy action when generating the target node and a second operator for indicating whether to perform a grammar copy action.

The first operator and the second operator may be trained and generated or may be set by the user as desired, which is not limited in the disclosure.

The grammar may be a formal rule describing the language grammatical structure, i.e., a syntax rule, which is not limited in the disclosure.

In addition, it can be determined whether to perform a copy action and whether to perform a grammar copy action when generating the target node based on the first operator and the second operator.

For example, a first threshold and a second threshold can be set in advance. If the first operator is greater than the first threshold, it indicates that the copy action is executed. In the case of executing the copy action, if the second operator is greater than the second threshold, it indicates that the grammar copy action is executed, and if the second operator is less than or equal to the second threshold, it indicates that the grammar copy action is not executed.

Alternatively, it may be possible to determine whether to perform a copy action and whether to perform a grammar copy action, based on a gate mechanism.

For example, Equation (5), as described below, can be used to determine whether to perform the copy action and whether to perform the grammar copy action.

$$\text{Prob} = \gamma * \text{ApplyRule} + (1-\gamma) * (\beta * \text{CopyRule} + (1-\beta) * \text{CopyTree}) \quad (5)$$

Prob is a probability value corresponding to the gate mechanism, ApplyRule indicates whether to perform the copy action, $\gamma$ is a probability corresponding to ApplyRule, CopyRule indicates whether to perform the grammar copy action, $\beta$ is a probability corresponding to CopyRule, CopyTree indicates not performing the copy action, $(1-\beta)$ is a probability corresponding to CopyTree.

For example, after calculating, the probability of "performing the copy action and the grammar copy action" in the gate mechanism is the largest, it is determined that the target generation strategy for the target node to be generated is: performing the copy action and performing the grammar copy action.

It is to be noted that the above examples are only illustrative and may not be used as a limitation of the target generation strategy, the first operator and the second operator in embodiments of the disclosure.

In 403, candidate grammar vectors of a second syntax tree corresponding to an adjacent query statement prior to the query statement is obtained in response to the first operator instructing to execute the copy action and the second operator instructing to execute the grammar copy action.

The second syntax tree may contain a variety of grammars, such as select and choose, and each grammar has its own grammar vector, which is not limited in the disclosure.

In addition, the second syntax tree may contain a candidate grammar vector or a plurality of grammar vectors, which is not limited in the disclosure.

In 404, a target grammar vector is determined based on a distance between each of the candidate grammar vectors and the first vector representation.

It is understood that the larger the distance between the candidate grammar vector and the first vector representation, the lower the matching degree between the candidate grammar vector and the first vector representation, and the smaller the distance between the candidate grammar vector and the first vector representation, the larger the matching degree between the candidate grammar vector and the first vector representation.

Therefore, the candidate grammar vector with the shortest distance between the candidate grammar vector and the first vector representation can be identified as the target grammar vector, to obtain the highest matching degree between the candidate grammar vector and the first vector representation, thus improving the accuracy and reliability of the target grammar vector.

The distance between the candidate grammar vector and the first vector representation can be determined in various ways, for example, the Euclidean distance formula and the Manhattan distance formula can be adopted, which is not limited in the disclosure.

In 405, the target node is generated based on the target grammar vector.

For example, the target node is generated based on the grammar corresponding to the target grammar vector. For example, the target grammar vector W corresponds to the grammar: Where:: =Condition1 And Condition2, thus the target node is generated based on the grammar, which is not limited in the disclosure.

Alternatively, a vector corresponding to the target node may be generated based on the target grammar vector, that is, the target node is generated.

It should be noted that the above examples are only illustrative and may not be used as a limitation of the manner of generating the target node, in embodiments of the disclosure.

In embodiments of the disclosure, the distance between the candidate grammar vector and the first vector representation is fully considered when determining the target grammar vector, so that the determined target question vector can be made more accurate and reliable. Subsequently, the target node generated based on the target grammar vector is also more accurate and reliable.

In 406, subtree vectors corresponding to candidate subtrees included in the second syntax tree are obtained in response to the first operator instructing to execute the copy action and the second operator not instructing to execute the grammar copy action.

The second syntax tree may contain a subtree or a plurality of subtrees, and each subtree corresponding to a respective subtree vector, which is not limited in the disclosure.

In 407, a target subtree vector is determined based on a distance between each of the subtree vectors and the first vector representation.

It is understood that the larger the distance between the candidate subtree vector (the vector of the candidate subtree or the subtree vector corresponding to the candidate subtree) and the first vector representation, the smaller the matching degree between the candidate subtree vector and the first vector representation, and the smaller the distance between the candidate subtree vector and the first vector representation, the higher the matching degree between the candidate subtree vector and the first vector representation.

Therefore, the candidate subtree vector with the shortest distance between the candidate subtree vector and the first vector representation is identified as the target subtree vector, to obtain the highest matching degree between the candidate subtree vector and the first vector representation, thereby improving the accuracy and reliability of the target subtree vector.

There may be various ways of determining the distance between the candidate subtree vector and the first vector representation, such as the Euclidean distance formula and the Manhattan distance formula, which is not limited in the disclosure.

In 408, a subtree corresponding to the target subtree vector is determined as the target node.

In embodiments of the disclosure, when the subtree corresponding to the target subtree vector is determined as the target node, the complete subtree can be copied directly, for example, the intermediate nodes and all the leaf nodes, included in the subtree, can be copied directly. Therefore, the complete semantics of the subtree is fully considered when determining the target node based on the subtree corresponding to the target subtree vector, to achieve a better understanding of the fragment and to provide subsequent processing.

Optionally, the target node is a leaf node, and the strategy may further include a third operator for indicating whether to perform a designated copy action when generating the target node, for example, the target node may be generated based on the designated copy action.

In detail, each candidate node vector contained in the second syntax tree, corresponding to the designated copy action, may be obtained in response to the third operator indicating to perform the designated copy action, after which the target node vector is determined based on the distance between each candidate node vector and the first vector representation, and then the target node is generated based on the target node vector.

The designated copy action may be a table name copy, a column name copy or a value copy, which is not limited in the disclosure.

For example, if the third operator indicates that the designated copy action to be performed is a column copy, each candidate node vector corresponding to the column copy contained in the second syntax tree, such as X1, X2 and X3, can be obtained. The target node vector is determined based on the distances between the candidate node vector X1, X2 or X3 and the first vector representation. The target node is generated based on the target node vector.

It is understood that the larger the distance between the candidate subtree vector and the first vector representation, the smaller the matching degree between the candidate subtree vector and the first vector representation, and the smaller the distance between the candidate subtree vector and the first vector representation, the higher the matching degree between the candidate subtree vector and the first vector representation.

Therefore, the candidate node vector with the smallest distance between each candidate node vector and the first vector representation can be identified as the target node vector, to obtain the highest matching degree between the candidate node vector and the first vector representation, thereby improving the accuracy and reliability of the target node vector.

There may be various ways of determining the distance between the candidate subtree vector and the first vector representation, such as the Euclidean distance formula and the Manhattan distance formula, which is not limited in the disclosure.

In embodiments of the disclosure, for the leaf node, each candidate node vector contained in the second syntax tree corresponding to the designated copy action can be obtained based on the execution of the designated copy action as indicated by the third operator. The target node vector is determined based on the distance between each candidate node vector and the first vector representation, and then the target node is generated based on the target node vector. Therefore, the context is fully considered in the process of determining the target node, thus improving the accuracy and reliability of the target node.

In 409, the query statement is generated based on the known nodes and a terminator in response to the target node being the terminator.

In embodiments, the first vector representation is determined based on known nodes in the first syntax tree corresponding to the query statement to be generated. The target generation strategy corresponding to the target node to be generated is determined based on the first vector representation and the preset copy reference matrix. The candidate grammar vectors of the second syntax tree corresponding to the adjacent query statement prior to the query statement is obtained in response to the first operator instructing to execute the copy action and the second operator instructing to execute the grammar copy action. The target grammar vector is determined based on the distance between each of the candidate grammar vectors and the first vector representation. The target node is generated. Alternatively, subtree vectors corresponding to candidate subtrees included in the second syntax tree are obtained in response to the first operator instructing to execute the copy action and the second operator not instructing to execute the grammar copy action. The target subtree vector is determined based on the distance between each of the subtree vectors and the first vector representation. The subtree corresponding to the target subtree vector is determined as the target node. Finally, the query statement is generated based on the known nodes and the terminator in response to the target node being the terminator. According to different actions indicated by different operators, the target node is determined in a corresponding way and the query statement can be generated afterwards. Therefore, the target node can be determined with the complete semantics of the context, which is more accurate and reliable, thus further improving the accuracy and reliability of the generated query statement.

In order to implement the above embodiments, the disclosure also provides an apparatus for generating a query statement.

Figure 5:
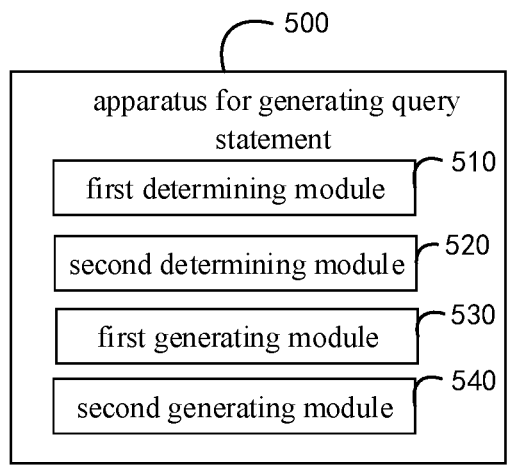
FIG. 5 is a block diagram of an apparatus for generating a query statement according to some embodiments of the disclosure.

FIG. 5 is a block diagram of an apparatus for generating a query statement according to some embodiments of the disclosure.

As shown in FIG. 5, the apparatus 500 for generating a query statement includes: a first determining module 510, a second determining module 520, a first generating module 530 and a second generating module 540.

The first determining module 510 is configured to determine a first vector representation based on known nodes in a first syntax tree corresponding to a query statement to be generated.

The second determining module 520 is configured to determine a target generation strategy corresponding to a target node to be generated based on the first vector representation and a preset copy reference matrix.

The first generating module 530 is configured to generate the target node based on the first vector representation or a second vector representation by performing the target generation strategy, in which the second vector representation is a vector representation corresponding to an adjacent query statement prior to the query statement to be generated.

The second generating module 540 is configured to generate the query statement based on the known nodes and a terminator in response to the target node being the terminator.

Optionally, the first determining module 510 is configured to: determine a third vector representation corresponding to a question sentence by encoding the question sentence; determine a reference vector representation based on the third vector representation, the second vector representation, and a knowledge base to be queried; determine a target generation strategy corresponding to a root node in the first syntax tree based on the reference vector representation and the preset copy reference matrix.

The first generating module 530 is configured to generate the root node based on the reference vector representation or the second vector representation by performing the target generation strategy corresponding to the root node.

Optionally, the apparatus further includes: an updating module and an executing module.

The updating module is configured to update the first vector representation based on the target node and the known nodes in response to the target node being not the terminator.

The executing module is configured to continue to determining the target generation strategy, based on the updated first vector representation, until the generated node is the terminator.

Optionally, the apparatus further includes: an encoding module and an obtaining module.

The encoding module is configured to determine a basic vector representation corresponding to each of nodes in a second syntax tree corresponding to an adjacent query statement prior to the query statement by encoding the adjacent query statement prior to the query statement.

The obtaining module is configured to update the basic vector representation corresponding to each of the nodes based on a relationship among the nodes in the second syntax tree, to obtain the second vector representation corresponding to the adjacent query statement prior to the query statement.

Optionally, the obtaining module is further configured to: obtain an updated vector representation of each of the nodes by updating the basic vector representation corresponding to each of the nodes based on a basic vector representation of each of one or more child nodes associated with the corresponding node and a weight factor of the corresponding node; and determine the second vector representation corresponding to the adjacent query statement prior to the query statement based on the updated vector representation of each of the nodes.

Optionally, the obtaining module is further configured to: determine one or more child nodes corresponding to each of the nodes based on the relationship among the nodes in the second syntax tree; obtain an updated vector representation of each of the nodes by inputting the base vector representation corresponding to each of the nodes and a base vector representation corresponding to each of the one or more child nodes, into a first attention model generated by training; and determine the second vector representation corresponding to the adjacent query statement prior to the query statement based on the updated vector representation of each of the nodes.

Optionally, the first determining module 510 is further configured to determine one or more child nodes corresponding to each of the nodes based on the relationship among the nodes in the second syntax tree. The first generating module 530 is further configured to obtain a third vector representation corresponding to a question sentence, and to obtain the updated vector representation corresponding to each of the nodes by inputting the third vector representation, the base vector representation corresponding to each of the nodes and the basic vector representation corresponding to each of the one or more child nodes, into a second attention model generated by training. The first determining module 510 is further configured to determine the second vector representation corresponding to the adjacent query statement prior to the query statement based on the updated vector representation of each of the nodes.

Optionally, the target node is a non-leaf child node, and the target generation strategy includes a first operator for indicating whether to perform a copy action when generating the target node and a second operator for indicating whether to perform a grammar copy action, and the first generating module 530 is further configured to: obtain candidate grammar vectors of a second syntax tree corresponding to an adjacent query statement prior to the query statement in response to the first operator instructing to execute the copy action and the second operator instructing to execute the grammar copy action; determine a target grammar vector based on a distance between each of the candidate grammar vectors and the first vector representation; and generate the target node based on the target grammar vector.

Optionally, the first generating module 530 is further configured to: obtain subtree vectors corresponding to candidate subtrees included in the second syntax tree in response to the first operator instructing to execute the copy action and the second operator not instructing to execute the grammar copy action; determine a target subtree vector based on a distance between each of the subtree vectors and the first vector representation; and determine a subtree corresponding to the target subtree vector as the target node.

Optionally, the target node is a leaf node, and the target generation strategy includes a third operator for indicating whether to perform a designated copy action when generating the target node, and the first generating module 530 is further configured to: obtain candidate node vectors corresponding to the designated copy action and included in the second syntax tree in response to the third operator instructing to execute the designated copy action; determine a target node vector based on a distance between each of the candidate node vectors and the first vector representation; and generate the target node based on the target node vector.

For the functions and specific implementation principles of the above modules in embodiments of the disclosure, reference should be made to the above method embodiments, which will not be repeated herein.

With the apparatus for generating the query statement of the disclosure, the first vector representation may be determined based on each known node in the first syntax tree corresponding to the query statement to be generated. The target generation strategy corresponding to the target node to be generated is determined based on the first vector representation and the preset copy reference matrix. The target node is generated based on the first vector representation or the second vector representation by performing the target generation strategy. The query statement is generated based on the known nodes and the terminator in response to the target node being the terminator. Therefore, in the process of generating the query statement, the context semantic information is fully considered, thereby improving the accuracy and reliability of the query statement.

According to embodiments of the disclosure, the disclosure also provides an electronic device, a readable storage medium and a computer program product.

Figure 6:
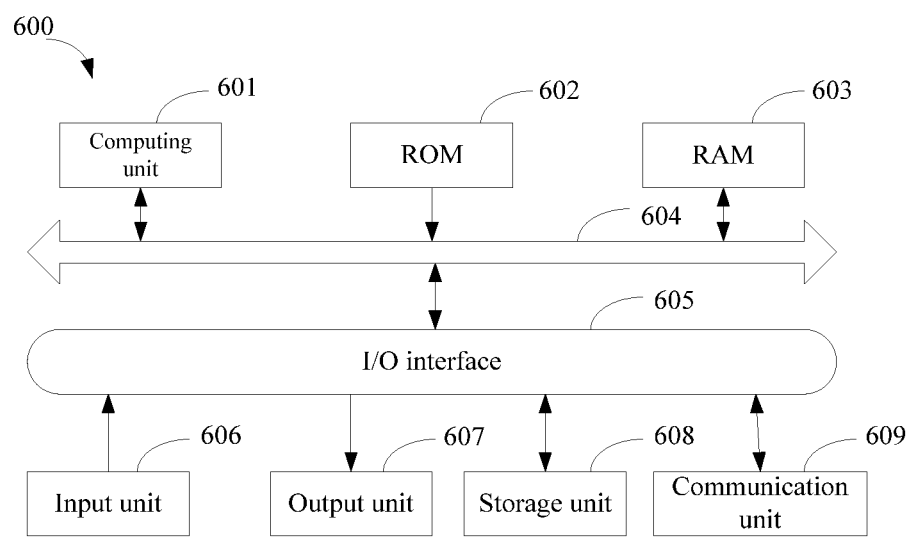
FIG. 6 is a block diagram of an electronic device used to implement a method for generating a query statement according to some embodiments of the disclosure.

FIG. 6 is a block diagram of an electronic device 600 according to embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 6, the device 600 includes a computing unit 601 performing various appropriate actions and processes based on computer programs stored in a read-only memory (ROM) 602 or computer programs loaded from the storage unit 608 to a random access memory (RAM) 603. In the RAM 603, various programs and data required for the operation of the device 900 are stored. The computing unit 601, the ROM 602, and the RAM 603 are connected to each other through a bus 604. An input/output (I/O) interface 605 is also connected to the bus 604.

Components in the device 600 are connected to the I/O interface 605, including: an inputting unit 606, such as a keyboard, a mouse; an outputting unit 607, such as various types of displays, speakers; a storage unit 608, such as a disk, an optical disk; and a communication unit 609, such as network cards, modems, wireless communication transceivers, and the like. The communication unit 609 allows the device 600 to exchange information/data with other devices through a computer network such as the Internet and/or various telecommunication networks.

The computing unit 601 may be various general-purpose and/or dedicated processing components with processing and computing capabilities. Some examples of computing unit 601 include, but are not limited to, a central processing unit (CPU), a graphics processing unit (GPU), various dedicated artificial intelligence (AI) computing chips, various computing units that run machine learning model algorithms, and a digital signal processor (DSP), and any appropriate processor, controller and microcontroller. The computing unit 601 executes the various methods and processes described above, such as the method for pushing information. For example, in some embodiments, the method may be implemented as a computer software program, which is tangibly contained in a machine-readable medium, such as the storage unit 608. In some embodiments, part or all of the computer program may be loaded and/or installed on the device 600 via the ROM 902 and/or the communication unit 609. When the computer program is loaded on the RAM 603 and executed by the computing unit 601, one or more actions of the method described above may be executed. Alternatively, in other embodiments, the computing unit 601 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), erasable programmable read-only memories (EPROM or flash memory), fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), the Internet and Block-chain network.

The computer system may include a client and a server. The client and server are generally remote from each other and interacting through a communication network. The client-server relation is generated by computer programs running on the respective computers and having a client-server relation with each other. The server can be a cloud server, also known as a cloud computing server or a cloud host, which is a host product in the cloud computing service system, to solve the traditional physical host with a Virtual Private Server (VPS) service, which has the defects of difficult management and weak business expansibility. The server can also be a server for a distributed system, or a server that incorporates a block chain.

According to the technical solution of the disclosure, a first vector representation is determined based on known nodes in a first syntax tree corresponding to a query statement to be generated. A target generation strategy corresponding to a target node to be generated is determined based on the first vector representation and a preset copy reference matrix. The target node is generated based on the first vector representation or a second vector representation by performing the target generation strategy. The query statement is generated based on the known nodes and a terminator in response to the target node being the terminator. Therefore, in the process of generating the query statement, the context semantic information is fully considered, thereby improving accuracy and reliability of the generated query statement.

It should be understood that the various forms of processes shown above can be used to reorder, add or delete actions. For example, the actions described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of the disclosure.

What is claimed is:

1. A method for generating a query statement implemented on a computing device comprising at least one processor,
   determining a query statement to be generated;
   obtaining a first syntax tree corresponding to the query statement to be generated in the process of determining the query statement to be generated, wherein the first syntax tree represents a deduction result of the query statement to be generated and includes known nodes indicating entities in the deduction result of the query statement to be generated;
   determining a first vector representation based on the known nodes in the first syntax tree corresponding to the query statement to be generated, wherein a vector corresponding to each known node in the first syntax tree is spliced or merged to obtain the first vector representation, and the vector is obtained by embedding each known node;
   determining a target generation strategy corresponding to a target node to be generated based on the first vector representation and a preset copy reference matrix, wherein the target node to be generated is a node that is not known in the first syntax tree and that is to be generated for the first syntax tree;
     wherein the target node is a non-leaf child node, and the target generation strategy comprises a first operator for indicating whether to perform a copy action when generating the target node and a second operator for indicating whether to perform a grammar copy action, and generating the target node based on the first vector representation or the second vector representation by performing the target generation strategy, comprises:
     obtaining candidate grammar vectors of a second syntax tree corresponding to an adjacent query statement prior to the query statement in response to the first operator instructing to execute the copy action and the second operator instructing to execute the grammar copy action;
     determining a target grammar vector based on a distance between each of the candidate grammar vectors and the first vector representation; and
     generating the target node based on the target grammar vector;
     or wherein the target node is a leaf node, and the target generation strategy comprises a third operator for indicating whether to perform a designated copy action when generating the target node, and generating the target node based on the first vector representation or the second vector representation by performing the target generation strategy, comprises:
     obtaining candidate node vectors corresponding to the designated copy action and included in the second syntax tree in response to the third operator instructing to execute the designated copy action;
     determining a target node vector based on a distance between each of the candidate node vectors and the first vector representation; and
     generating the target node based on the target node vector;
   generating the target node based on the first vector representation or a second vector representation by performing the target generation strategy, wherein the second vector representation is a vector representation corresponding to an adjacent query statement prior to the query statement to be generated; and
   generating the query statement based on the known nodes and a terminator in response to the target node being the terminator, wherein the terminator represents an end of the query statement to be generated;
   wherein the method further comprising:
   determining a third vector representation corresponding to a question sentence by encoding the question sentence;

determining a reference vector representation based on the third vector representation, the second vector representation and a knowledge base to be queried;
determining a target generation strategy corresponding to a root node in the first syntax tree based on the reference vector representation and the preset copy reference matrix; and
generating the root node based on the reference vector representation or the second vector representation by performing the target generation strategy corresponding to the root node;
wherein the question sentence is in a voice form which is transformed into a text form.

2. The method as claimed in claim 1, further comprising:
updating the first vector representation based on the target node and the known nodes in response to the target node being not the terminator; and
continuing to determine the target generation strategy, based on the updated first vector representation.

3. The method as claimed in claim 1, further comprising:
determining a basic vector representation corresponding to each of nodes in a second syntax tree corresponding to an adjacent query statement prior to the query statement by encoding the adjacent query statement prior to the query statement; and
updating the basic vector representation corresponding to each of the nodes based on a relationship among the nodes in the second syntax tree, to obtain the second vector representation corresponding to the adjacent query statement prior to the query statement.

4. The method as claimed in claim 3, wherein updating the basic vector representation corresponding to each of the nodes based on the relationship among the nodes in the second syntax tree, to obtain the second vector representation corresponding to the adjacent query statement prior to the query statement, comprises:
obtaining an updated vector representation of each of the nodes by updating the basic vector representation corresponding to each of the nodes based on a basic vector representation of each of one or more child nodes associated with the corresponding node and a weight factor of the corresponding node; and
determining the second vector representation corresponding to the adjacent query statement prior to the query statement based on the updated vector representation of each of the nodes.

5. The method as claimed in claim 3, wherein updating the basic vector representation corresponding to each of the nodes based on the relationship among the nodes in the second syntax tree, to obtain the second vector representation corresponding to the adjacent query statement prior to the query statement, comprises:
determining one or more child nodes corresponding to each of the nodes based on the relationship among the nodes in the second syntax tree;
obtaining an updated vector representation of each of the nodes by inputting the basic vector representation corresponding to each of the nodes and a basic vector representation corresponding to each of the one or more child nodes, into a first attention model generated by training; and
determining the second vector representation corresponding to the adjacent query statement prior to the query statement based on the updated vector representation of each of the nodes.

6. The method as claimed in claim 3, further comprising:
determining one or more child nodes corresponding to each of the nodes based on the relationship among the nodes in the second syntax tree;
obtaining a third vector representation corresponding to a question sentence;
obtaining the updated vector representation corresponding to each of the nodes by inputting the third vector representation, the basic vector representation corresponding to each of the nodes and the basic vector representation corresponding to each of the one or more child nodes, into a second attention model generated by training; and
determining the second vector representation corresponding to the adjacent query statement prior to the query statement based on the updated vector representation of each of the nodes.

7. The method as claimed in claim 1, further comprising:
obtaining subtree vectors corresponding to candidate subtrees included in the second syntax tree in response to the first operator instructing to execute the copy action and the second operator not instructing to execute the grammar copy action;
determining a target subtree vector based on a distance between each of the subtree vectors and the first vector representation; and
determining a subtree corresponding to the target subtree vector as the target node.

8. An electronic device, comprising:
at least one processor; and
a memory communicatively connected with the at least one processor; wherein,
the memory is configured to store instructions executable by the at least one processor, and the at least one processor is configured to execute the instructions to carry out:
determining a query statement to be generated;
obtaining a first syntax tree corresponding to the query statement to be generated in the process of determining the query statement to be generated, wherein the first syntax tree represents a deduction result of the query statement to be generated and includes known nodes indicating entities in the deduction result of the query statement to be generated;
determining a first vector representation based on the known nodes in the first syntax tree corresponding to the query statement to be generated, wherein a vector corresponding to each known node in the first syntax tree is spliced or merged to obtain the first vector representation, and the vector is obtained by embedding each known node;
determining a target generation strategy corresponding to a target node to be generated based on the first vector representation and a preset copy reference matrix, wherein the target node to be generated is a node that is not known in the first syntax tree and that is to be generated for the first syntax tree;
wherein the target node is a non-leaf child node, and the target generation strategy comprises a first operator for indicating whether to perform a copy action when generating the target node and a second operator for indicating whether to perform a grammar copy action, and generating the target node based on the first vector representation or the second vector representation by performing the target generation strategy, comprises:
obtaining candidate grammar vectors of a second syntax tree corresponding to an adjacent query statement prior to the query statement in response to the first operator instructing to execute the copy action and the second operator instructing to execute the grammar copy action;
determining a target grammar vector based on a distance between each of the candidate grammar vectors and the first vector representation; and
generating the target node based on the target grammar vector;
or wherein the target node is a leaf node, and the target generation strategy comprises a third operator for indicating whether to perform a designated copy action when generating the target node, and generating the target node based on the first vector representation or the second vector representation by performing the target generation strategy, comprises:
obtaining candidate node vectors corresponding to the designated copy action and included in the second syntax tree in response to the third operator instructing to execute the designated copy action;
determining a target node vector based on a distance between each of the candidate node vectors and the first vector representation; and
generating the target node based on the target node vector;
generating the target node based on the first vector representation or a second vector representation by performing the target generation strategy, wherein the second vector representation is a vector representation corresponding to an adjacent query statement prior to the query statement to be generated; and
generating the query statement based on the known nodes and a terminator in response to the target node being the terminator, wherein the terminator represents an end of the query statement to be generated;
wherein the at least one processor is further configured to execute the instructions to carry out:
determining a third vector representation corresponding to a question sentence by encoding the question sentence;
determining a reference vector representation based on the third vector representation, the second vector representation and a knowledge base to be queried;
determining a target generation strategy corresponding to a root node in the first syntax tree based on the reference vector representation and the preset copy reference matrix; and
generating the root node based on the reference vector representation or the second vector representation by performing the target generation strategy corresponding to the root node;
wherein the question sentence is in a voice form which is transformed into a text form.

9. The electronic device as claimed in claim 8, wherein the at least one processor is configured to execute the instructions to further carry out:
updating the first vector representation based on the target node and the known nodes in response to the target node being not the terminator; and
continuing to determining the target generation strategy, based on the updated first vector representation.

10. The electronic device as claimed in claim 8, wherein the at least one processor is configured to execute the instructions to further carry out:
determining a basic vector representation corresponding to each of nodes in a second syntax tree corresponding to an adjacent query statement prior to the query statement by encoding the adjacent query statement prior to the query statement; and
updating the basic vector representation corresponding to each of the nodes based on a relationship among the nodes in the second syntax tree, to obtain the second vector representation corresponding to the adjacent query statement prior to the query statement.

11. The electronic device as claimed in claim 10, wherein updating the basic vector representation corresponding to each of the nodes based on the relationship among the nodes in the second syntax tree, to obtain the second vector representation corresponding to the adjacent query statement prior to the query statement, comprises:
obtaining an updated vector representation of each of the nodes by updating the basic vector representation corresponding to each of the nodes based on a basic vector representation of each of one or more child nodes associated with the corresponding node and a weight factor of the corresponding node; and
determining the second vector representation corresponding to the adjacent query statement prior to the query statement based on the updated vector representation of each of the nodes.

12. The electronic device as claimed in claim 10, wherein updating the basic vector representation corresponding to each of the nodes based on the relationship among the nodes in the second syntax tree, to obtain the second vector representation corresponding to the adjacent query statement prior to the query statement, comprises:
determining one or more child nodes corresponding to each of the nodes based on the relationship among the nodes in the second syntax tree;
obtaining an updated vector representation of each of the nodes by inputting the basic vector representation corresponding to each of the nodes and a basic vector representation corresponding to each of the one or more child nodes, into a first attention model generated by training; and
determining the second vector representation corresponding to the adjacent query statement prior to the query statement based on the updated vector representation of each of the nodes.

13. The electronic device as claimed in claim 10, wherein the at least one processor is configured to execute the instructions to further carry out:
determining one or more child nodes corresponding to each of the nodes based on the relationship among the nodes in the second syntax tree;
obtaining a third vector representation corresponding to a question sentence;
obtaining the updated vector representation corresponding to each of the nodes by inputting the third vector representation, the basic vector representation corresponding to each of the nodes and the basic vector representation corresponding to each of the one or more child nodes, into a second attention model generated by training; and
determining the second vector representation corresponding to the adjacent query statement prior to the query statement based on the updated vector representation of each of the nodes.

14. A non-transitory computer-readable storage medium storing computer instructions, wherein the computer instructions are configured to make the computer execute a method including:
- determining a query statement to be generated;
- obtaining a first syntax tree corresponding to the query statement to be generated in the process of determining the query statement to be generated, wherein the first syntax tree represents a deduction result of the query statement to be generated and includes known nodes indicating entities in the deduction result of the query statement to be generated;
- determining a first vector representation based on the known nodes in the first syntax tree corresponding to the query statement to be generated, wherein a vector corresponding to each known node in the first syntax tree is spliced or merged to obtain the first vector representation, and the vector is obtained by embedding each known node;
- determining a target generation strategy corresponding to a target node to be generated based on the first vector representation and a preset copy reference matrix, wherein the target node to be generated is a node that is not known in the first syntax tree and that is to be generated for the first syntax tree;
  - wherein the target node is a non-leaf child node, and the target generation strategy comprises a first operator for indicating whether to perform a copy action when generating the target node and a second operator for indicating whether to perform a grammar copy action, and generating the target node based on the first vector representation or the second vector representation by performing the target generation strategy, comprises:
    - obtaining candidate grammar vectors of a second syntax tree corresponding to an adjacent query statement prior to the query statement in response to the first operator instructing to execute the copy action and the second operator instructing to execute the grammar copy action;
    - determining a target grammar vector based on a distance between each of the candidate grammar vectors and the first vector representation; and
    - generating the target node based on the target grammar vector;
  - or wherein the target node is a leaf node, and the target generation strategy comprises a third operator for indicating whether to perform a designated copy action when generating the target node, and generating the target node based on the first vector representation or the second vector representation by performing the target generation strategy, comprises:
    - obtaining candidate node vectors corresponding to the designated copy action and included in the second syntax tree in response to the third operator instructing to execute the designated copy action;
    - determining a target node vector based on a distance between each of the candidate node vectors and the first vector representation; and
    - generating the target node based on the target node vector;
- generating the target node based on the first vector representation or a second vector representation by performing the target generation strategy, wherein the second vector representation is a vector representation corresponding to an adjacent query statement prior to the query statement to be generated; and
- generating the query statement based on the known nodes and a terminator in response to the target node being the terminator, wherein the terminator represents an end of the query statement to be generated;
- wherein the method further comprising:
- determining a third vector representation corresponding to a question sentence by encoding the question sentence;
- determining a reference vector representation based on the third vector representation, the second vector representation and a knowledge base to be queried;
- determining a target generation strategy corresponding to a root node in the first syntax tree based on the reference vector representation and the preset copy reference matrix; and
- generating the root node based on the reference vector representation or the second vector representation by performing the target generation strategy corresponding to the root node;
- wherein the question sentence is in a voice form which is transformed into a text form.

* * * * *